United States Patent [19]

Miller

[11] Patent Number: 4,712,777

[45] Date of Patent: Dec. 15, 1987

[54] FLUID FILLED VIBRATION ISOLATOR HAVING PRECISELY ADJUSTABLE DYNAMIC OPERATING CHARACTERISTICS

[75] Inventor: H. Timothy Miller, Erie, Pa.

[73] Assignee: Lord Corporation, Erie, Pa.

[21] Appl. No.: 900,167

[22] Filed: Aug. 25, 1986

[51] Int. Cl.⁴ .......................... F16F 13/00; F16F 9/34
[52] U.S. Cl. ................................. 267/140.1; 188/299
[58] Field of Search ................ 248/562; 267/8 R, 35, 267/140.1, 140.2, 140.3, 141; 188/285, 289, 299

[56] References Cited

U.S. PATENT DOCUMENTS

| | | | |
|---|---|---|---|
| 4,415,148 | 11/1983 | Mair et al. | 267/122 |
| 4,505,462 | 3/1985 | Dan et al. | 267/562 |
| 4,531,484 | 7/1985 | Kimura et al. | 123/192 |
| 4,537,275 | 8/1985 | Kimura et al. | 180/300 |
| 4,610,438 | 9/1986 | Eberhard et al. | 267/140.1 X |
| 4,635,910 | 1/1987 | Ozawa et al. | 267/140.1 |

FOREIGN PATENT DOCUMENTS

| | | | |
|---|---|---|---|
| 0110197 | 11/1982 | European Pat. Off. | |
| 0151637 | 8/1984 | Japan | 267/140.1 |
| 0231234 | 12/1984 | Japan | 267/140.1 |
| 0129944 | 11/1985 | Japan | |

Primary Examiner—Duane A. Reger
Attorney, Agent, or Firm—Philip P. McCann; James W. Wright

[57] ABSTRACT

A fluid filled vibration isolator having a pair of chambers separated by a partition in which is formed an inertia track passageway cooperable with a decoupler to provide certain dynamic operating characteristics is provided with a means for varying the compliance of one of the chambers to enable the dynamic operating characteristics to be precisely adjusted in the course of operation. In the embodiment disclosed, an air chamber is superimposed above a fluid chamber and is separated therefrom by a diaphragm movable into the chamber in response to a differential control pressure, such as a vacuum, applied therein. A shutter panel is mounted to the underside of the diaphragm and moved therewith into and out of engagement with a rigid stop surrounding the diaphragm. When disengaged from the stop, the air chamber contributes to the overall compliance of the fluid chamber. When engaged with the stop, the shutter panel isolates the air chamber from fluid pressure variations, thereby changing the overall compliance of the fluid chamber.

8 Claims, 4 Drawing Figures

FLUID FILLED VIBRATION ISOLATOR HAVING PRECISELY ADJUSTABLE DYNAMIC OPERATING CHARACTERISTICS

FIELD OF THE INVENTION

The present invention relates to fluid filled vibration isolators, and more particularly, the present invention relates to fluid filled vibration isolators having dynamic operating characteristics that can be adjusted in response to a control.

BACKGROUND OF THE INVENTION

Fluid filled vibration isolators are being used increasingly to mount engines and transmissions to the frames of automotive vehicles. A typical fluid filled vibration isolator includes a pair of opposed variable volume fluid filled chambers separated by a partition in which is provided an elongate arcuate inertia track passageway providing continuous fluid communication between the chambers. A decoupler is mounted in the partition and cooperates with the inertia track passageway to provide certain dynamic operating characteristics. The vibration isolator is tuned to provide various magnitudes of stiffness and damping within particular frequency and amplitude ranges to eliminate idle shake, engine bounce, noise, and like problems.

In most commercially available fluid filled vibration isolators, the dynamic operating characteristics are determined by the design of the isolator. Some have proposed fluid filled vibration isolators which are designed so that their dynamic operating characteristics can be actively controlled in response to various conditions such as vehicle and engine speeds, and the like. Examples of such mounts may be found in the following U. S. Pat. Nos. 4,415,148; 4,505,462; 4,531,484; 4,537,275; and in Japanese Published Appln. No. 57-129944. In U.S. Pat. No. 4,505,462, the compliance of one or both of the fluid filled chambers is adjusted, and the dynamic operating characteristics of the mount thereby changed, either by constricting the periphery of one of the chambers or by varying the pressure of air in a chamber confronting a flexible wall which defines a portion of another one of the fluid chambers. In German Published Appln. No. 3,244,296 a fluid filled mount is provided with a diaphragm confronting one of the fluid filled chambers, and air is contained in a chamber behind the diaphragm to affect the overall compliance of the fluid filled chamber.

Known actively controlled fluid filled vibration isolators having air chambers wherein the pressure is regulated to vary the compliance of the fluid filled chamber have certain limitations. For one thing, such isolators require a source of compressed air which may or may not be readily available on a vehicle, and which is generally not provided in most automobiles. Secondly, while air pressure regulation can vary the frequency at which minimum and maximum dynamic stiffnesses occur, as well as their magnitudes, the dynamic operating characteristics tend to change in an analog manner, i.e. gradually, thereby blurring desirable sharp distinctions in the dynamic stiffness characteristics. While there may be certain applications in which actively controlled fluid filled vibration isolators which do not have precisely adjustable dynamic stiffness characteristics may function satisfactorily, there is a need for an actively controlled fluid filled vibration isolator which can be positively adjusted to provide precisely predictable dynamic operating characteristics.

OBJECTS OF THE INVENTION

With the foregoing in mind, a primary object of the present invention is to provide a novel fluid filled vibration isolator which can be actively controlled to provide precisely adjustable dynamic operating characteristics.

Another object of the present invention is to provide an improved fluid filled vibration isolator having dynamic operating characteristics which are capable of being precisely adjusted by varying the compliance of one of the fluid filled chambers.

As another object, the present invention provides a unique fluid filled vibration isolator having control responsive means for changing the compliance of a fluid chamber thereof and thus effecting a positive shift in certain of its dynamic operating characteristics.

As a still further object, the present invention provides an actively controllable fluid filled vibration isolator which utilizes a vacuum to effect a positive and precise change in dynamic operating characteristics to thereby render the vibration isolator particularly suited for use in automobiles.

Yet another object of the present invention is to provide an actively controllable fluid filled vibration isolator having a minimum of moving parts rendering it inexpensive to manufacture and reliable in operation.

SUMMARY OF THE INVENTION

More specifically, the present invention provides a fluid filled vibration isolator having dynamic operating characteristics which are capable of being positively and precisely adjusted in response to a control. In the vibration isolator of the present invention, the compliance of one of its flexible walls is controlled by either permitting a portion of it to flex or preventing it from flexing in response to variations in pressure within the fluid chamber adjacent the wall. In the disclosed embodiment, a compressible fluid control chamber is provided adjacent the fluid chamber and is separated therefrom by a flexible diaphragm to which is attached a relatively inflexible shutter panel disposed in the fluid chamber. The shutter panel is movable into and out of engagement with a shoulder surrounding the diaphragm. When the shutter panel is disengaged from its shoulder, the compliance of the diaphragm and air contained in the air chamber contributes to the overall compliance of the fluid filled chamber. When the pressure of the air is regulated, as by a vacuum being drawn in the control chamber, the diaphragm flexes inwardly thereof and displaces the shutter panel against its shoulder to thereby isolate the diaphragm and air chamber from the fluid filled chamber and to prevent the diaphragm from flexing in response to fluid pressure variations in the control fluid chamber. As a result, certain dynamic stiffness characteristics of the vibration isolator can be shifted positively and precisely from one frequency range to another, such as from a lower frequency when the shutter panel is extended to a higher frequency when it is retracted.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
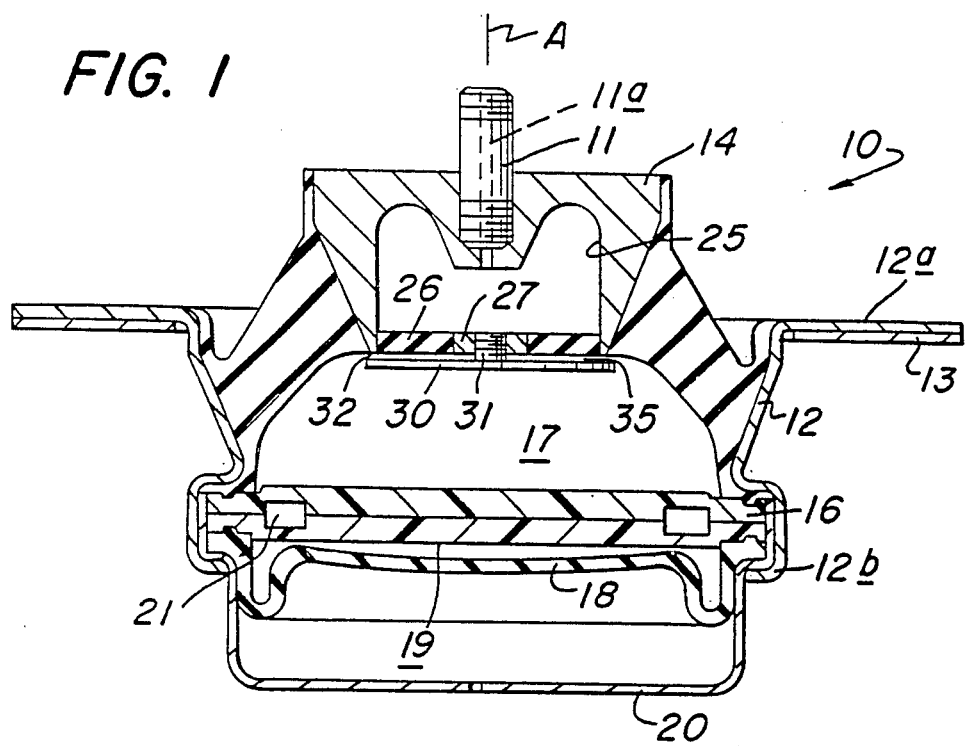
FIG. 1 is a longitudinal sectional view of an actively controllable fluid filled vibration isolator embodying the present invention illustrating the isolator in one of its operational modes.

Referring now to the drawings, FIG. 1 illustrates a vibration isolator 10 which embodies the present invention. The vibration isolator 10 includes an upstanding mounting stud 11 adapted to be connected to an upper bracket structure, such as on a vehicle engine, and a stamped metal base 12 having a peripheral flange 12a adapted to be fastened to a lower bracket structure, such as carried on the frame 13 of a vehicle. The stud 11 is threaded into a rigid core 14 which is connected to the base 12 by a frusto-conical tubular wall 15 of resilient material, such as an elastomer, bonded therebetween in the manner shown to mount the core 14 for vertical translation on the axis A. A bipartite molded plastic partition 16 extends transversly across the base 12, the core 14 and the flexible wall 15 for cooperating therewith to define an upper chamber 17 adapted to contain a working fluid (not shown). A flexible wall, or diaphragm, 18 is disposed below the partition 16 and cooperates therewith to define a lower chamber 19 which is also adapted to contain working fluid displaced from the upper chamber 17. The partition 16, and its underlying diaphragm 18, are retained in a stamped metal cup 20 which is fastened to the base 12 as by an inwardly radially deformed flange 12b thereof. Thus, a pair of variable volume fluid tight chambers are provided for containing a working fluid and for subjecting the same to alternating pressure in response to vibrations, as well known in the art.

In order to develop the desired degree of dynamic stiffness and damping in the isolator 10, an elongate arcuate inertia track passageway 21 is provided in the partition 16. The inertia track passageway is open at one end into the upper chamber 17 and is open at its other end into the lower chamber 19. A decoupler disc (not shown) may be confined in a cavity between the upper and lower fluid chambers 17 and 19 and mounted for vertical translation therein. When installed, the decoupler disc cooperates with the inertia track passageway in a well known manner to provide certain desirable dynamic operating characteristics, as well known in the art. For a more complete description of the dynamic operating characteristics of a conventional fluid filled vibration isolator having an inertia track passageway and a decoupler, reference is made to an article entitled "*Understanding Hydraulic Mounts for Improved Vehicle Noise, Vibration and Ride Qualities*" by Wallace C. Flower, SAE Technical Paper Series, No. 850975, May 1985, the disclosure of which is incorporated by reference herein.

As well known in the art, the complex dynamic stiffness of a fluid filled vibration isolator of the type described thus far exhibits a minimum dynamic stiffness, or notch in the dynamic stiffness curve, at a relatively low excitation frequency followed by a maximum dynamic stiffness, or peak in the dynamic stiffness curve, at a slightly higher frequency. Peak damping usually occurs between these stiffness levels and frequencies, as generally indicated by the location and magnitude of the parabolic phase or loss angle curve associated with the dynamic stiffness curve. In a commercially desirable vibration isolator, it is important for it to have a dynamic stiffness curve with distinct peaks and notches and for the peaks and notches to be located at precise frequencies. As discussed heretofore, there has not been commercially available a fluid filled vibration isolator which can be actively controlled without adversely affecting these characteristics.

The present invention overcomes the limitations of known actively controllable fluid filled vibration isolators by positively changing the compliance of one of the fluid filled chambers in response to a control. To this end, a control fluid chamber, or cavity, 25 is provided in the core 14 adjacent to and above the upper working fluid chamber 17. A flexible wall, or diaphragm, 26 is bonded within and extends across the lower end of the control fluid chamber 25 to separate it from the upper working fluid chamber 17. A conduit 11a is provided in the mounting stud 11 to enable the volume of the control fluid in the control fluid chamber 25 to be initially adjusted as by either admitting or exhausting control fluid therefrom, and thereafter the pressure to be adjusted as by means of either a pressure or a vacuum pump. Preferably, the control fluid is compressible and includes a gas, such as air, and the conduit 11a is connected via appropriate control valves to a source of vacuum for purposes to be described.

The compressible control fluid chamber 25 and its diaphragm 26 cooperate with the working fluid chamber flexible wall 15 to provide the upper working fluid chamber 17 with a predetermined overall compliance. In other words, a portion of the overall compliance of the upper fluid chamber 17 is provided by the diaphragm 26 acting against the air contained in the control fluid chamber 25. Thus, the overall compliance of the upper fluid chamber 17 can be adjusted by regulating the pressure of the air in the control fluid chamber 25. While this has been done in the prior art to effect active control of the dynamic operating characteristics of the vibration isolator, it has been accompanied by the loss of positive and precise changes in operating characteristics.

Figure 2:
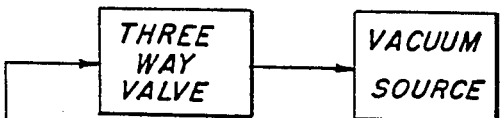
FIG. 2 is a greatly enlarged fragmentary sectional view of a portion of the vibration isolator illustrated in FIG. 1 illustrating it in another of its operational modes.
Figure 2:
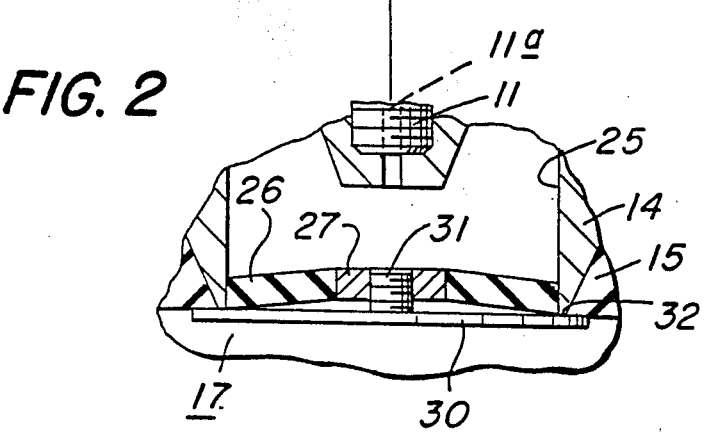

According to the present invention, the aforementioned limitations are overcome by providing a relatively inflexible shutter panel means 30 which can be moved across the diaphragm either to expose it or to isolate it from its associated working fluid chamber in response to a control. In the illustrated embodiment, the shutter panel means 30 is mounted to and below the diaphragm 26 and is movable therewith between an extended position, such as illustrated in FIG. 1, and a retracted position, such as illustrated in FIG. 2. Preferably, the shutter panel 30 includes a flat circular rigid metal disc having a stud 31 which is threaded into a nut 27 bonded centrally of the control fluid chamber diaphragm 26. An annular seat, or shoulder, 32 is provided on the bottom of the rigid cylindrical wall which forms the control fluid chamber 25 in the core 14, the annular shoulder 32 confronting the topside of the shutter panel 30 inwardly adjacent its periphery. A gap 35 is provided between the underside of the diaphragm 26 and the topside of the shutter panel 30 to permit it to move with and substantially parallel to the diaphragm 26 into and out of engagement with its seat 32. A gap of about ⅛ inch to about ¼ inch is sufficient for this purpose.

In operation, when the shutter panel 30 is in the extended position illustrated in FIG. 1, fluid pressure acts on the diaphragm 26 and hence on the compressible fluid in the control fluid chamber 25. Thus, in the extended position illustrated in FIG. 1, the diaphragm 26 cooperates with the compressible control fluid medium in the chamber 25 and with the flexible working fluid chamber wall 15 to provide the upper working fluid chamber 17 with a predetermined overall compliance. When operating with air at atmospheric pressure within the control fluid chamber 25, and with the shutter panel 30 in the extended position illustrated in FIG. 1, the vibration isolator 10 exhibits the dynamic operating characteristics illustrated in the dashed curves of FIGS. 3 and 4. For instance, at a ±0.10 millimeter input exciation amplitude, the vibration isolator 10 exhibits a peak dynamic stiffness of about 500 Newtons per millimeter (N/mm) at a frequency level of about 15 Hertz.

When the shutter panel 30 is retracted, such as when the air pressure in the control fluid chamber 25 is reduced by a vacuum being drawn in the control fluid chamber 25, the shutter panel 30 is pulled upwardly against its supporting seat 32 in the manner illustrated in FIG. 2 as the volume of the control fluid in the chamber 25 is initially reduced by air being exhausted therefrom. The shutter panel 30 thereby bridges across its seat 32 and isolates the diaphragm 26, and air contained in its associated control fluid chamber 25, from fluid pressure variations occurring within the upper working fluid chamber 17. Once the shutter panel 30 is engaged with its seat 32, further reductions in air pressure (or increases in vacuum) in the control fluid chamber 25 simply increase the seating pressure of the shutter panel and do not affect the performance of the vibration isolator 10.

Figure 3:
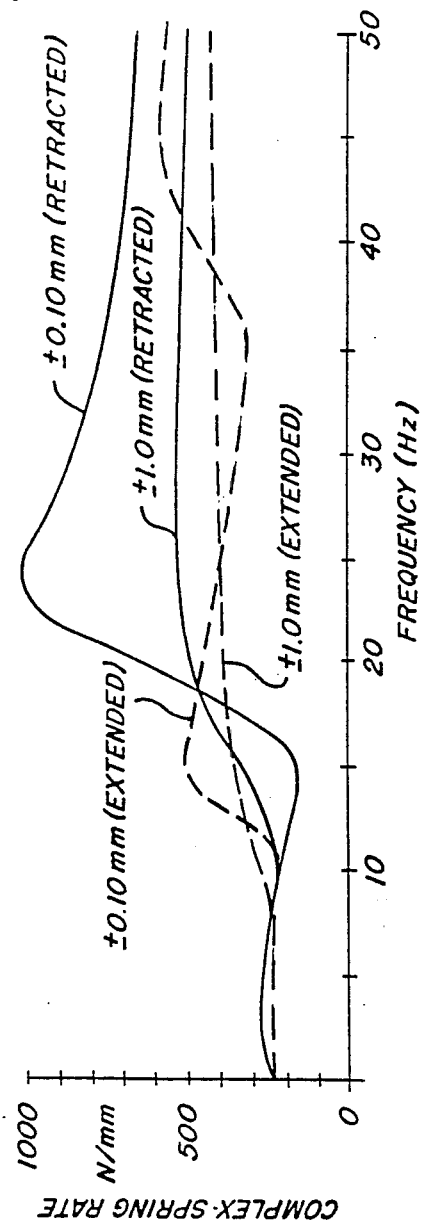
FIGS. 3 and 4 are curves illustrating the complex dynamic stiffness characteristics of the vibration isolator of the present invention in various modes of operation.
Figure 4:
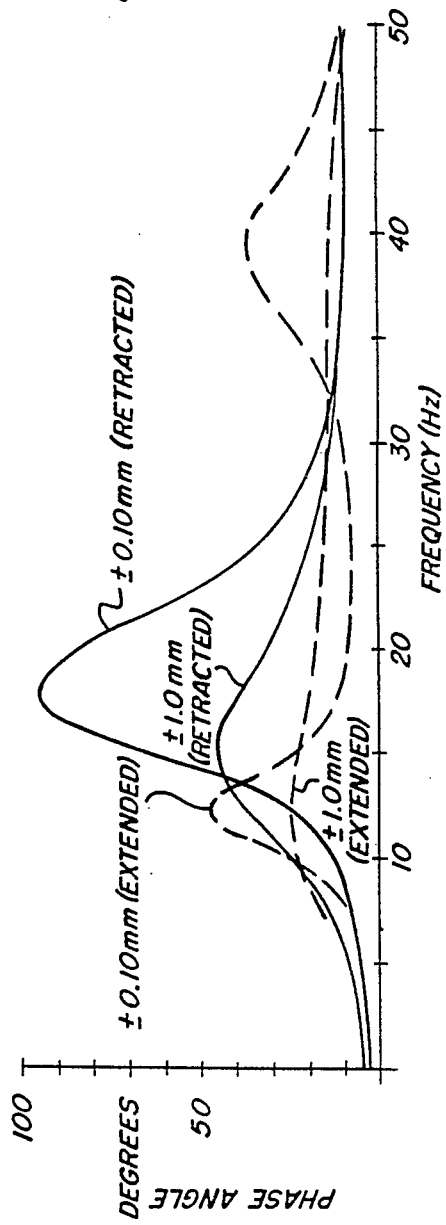

When the shutter panel 30 is in its retracted position, the vibration isolator 10 exhibits the dynamic operating characteristics indicated by the solid line curves in FIGS. 3 and 4. From these curves, it may be seen that at an input excitation amplitude of ±0.10 millimeters, the vibration isolator 10 has a maximum complex dynamic stiffness of about 1000 Newtons per millimeter at a frequency of about 25 Hertz. This is to be contrasted with the corresponding values of about 500 N/mm. and 15 Hertz, respectively when extended. Thus, it may be observed that with the vibration isolator of the present invention, there is a distinct and positive shift in the frequency level at which peak damping occurs, as well as a significant change in the magnitude of peak damping, particularly at low input excitation amplitudes. It will also be observed that the performance curves of the vibration isolator in the shutter retracted position retain their relatively sharply defined notches and peaks.

In view of the foregoing, it should be apparent that the present invention now provides an improved fluid filled vibration isolator which can be actively controlled in response to some condition, such as engine or vehicle speed, to provide a positive and precise change in dynamic operating characteristics. While the design of the isolator is well suited to control by vacuum, rendering it particularly suited for use on automobiles where vacuum sources are readily available, other means may be provided, such as electrical solenoids, mechanical linkages, or the like for displacing the shutter panel. Furthermore, because of the simplicity of its design, the illustrated embodiment of the actively controlled vibration isolator of the present invention is rugged and reliable in operation and capable of being manufactured readily.

While a preferred embodiment of the present invention has been described in detail, various modifications, alterations and changes may be made without departing from the spirit and scope of the present invention as defined in the appended claims.

I claim:

1. In a fluid filled vibration isolator having compliant means providing a variable volume working fluid chamber displaceable in response to vibrations of the working fluid and an inertia track passageway cooperable therewith to provide certain dynamic operating characteristics, a control fluid chamber adjacent to said working fluid chamber for containing a control fluid, and flexible means separating said control fluid chamber from said working fluid chamber while normally providing a portion of the overall compliance of said working fluid chamber, the improvement comprising: means movable in response to a control for selectively either permitting said flexible means to flex or preventing said flexible means from flexing relative to said control fluid chamber in response to dynamic pressure variations in said working fluid chamber for thereby affecting the contribution of the flexible means to the overall compliance of said compliant means, whereby certain dynamic operating characteristics of the vibration isolator can be precisely modified wherein (a) said movable means includes a shutter panel disposed alongside said flexible means and movable in relation thereto;

(b) said shutter panel is disposed intermediate said control fluid chamber and said working fluid chamber and is movable between extended and retracted positions in said working fluid chamber; and (c) said shutter panel is stiff relative to said flexible means and is at least coextensive in area therewith, and including abutment means carried by said complaint means around said flexible means, said abutment means being engageable by said shutter panel in response to retraction thereof toward said control fluid chamber from its extended position in said working fluid chamber for completely isolating said flexible means from dynamic pressure variations occurring in said working fluid chamber.

2. A fluid filled vibration isolator according to claim 1 including means connecting said shutter panel to said flexible means for movement in unison in spaced substantially parallel relation, and conduit means providing fluid communication with said control chamber for permitting the volume of the control fluid in said control fluid chamber to be regulated to thereby effect movement of said shutter panel.

3. A fluid filled vibration isolator according to claim 2 including mounting means carried by said compliant means for movement therewith in response to vibrations and providing said control chamber therein with an end thereof confronting said working fluid chamber, said control panel extending across said end of said control fluid chamber and said flexible means being recessed inwardly from said end.

4. A fluid filled vibration isolator according to claim 3 wherein said control fluid chamber is adapted to contain a compressible fluid, and including means for adjusting the pressure of said compressible fluid therein.

5. In a fluid filled vibration isolator having compliant means providing a variable volume working fluid chamber displaceable in response to vibrations of the working fluid and an inertia track passageway cooperable therewith to provide certain dynamic operating characteristics, a control fluid chamber adjacent to said working fluid chamber for containing a control fluid, and flexible means separating said control fluid chamber from said working chamber while normally providing a portion of the overall compliance of said working fluid chamber, the improvement comprising: shutter panel means selectively movable in said working fluid chamber between alternate positions either exposing or isolating said flexible means from fluid pressure variations in said chamaber for thereby effecting changes in the overall compliance of said working fluid chamber, and means for displacing said shutter panel means between said alternate positions, whereby the dynamic operating characteristics of the isolator can be adjusted wherein said shutter panel displacing means includes mounting means carried by said compliant means and providing said control fluid chamber with an open end confronting said working fluid chamber, a diaphragm closing said open end of said control fluid chamber for separating the control fluid chamber from said working fluid chamber, means connecting said diaphragm to said shutter panel means so that movement of said diaphragm inwardly of said control fluid chamber retracts said shutter panel means, and means for controlling the pressure of the control fluid in said control fluid chamber for displacing said diaphragm and thereby moving said shutter panel means.

6. A vibration isolator according to claim 5 wherein said shutter panel means includes a relatively inflexible panel member extending across said diaphragm in substantially parallel spaced relation therewith, and means including a shoulder adjacent to said open end of said control fluid chamber for engaging said shutter panel in its retracted position and thereby causing fluid pressure variations occurring in said working fluid chamber to be isolated from said diaphragm.

7. A fluid filled vibration isolator according to claim 6 wherein said control fluid includes a compressible fluid adapted to be pressurized in said control fluid chamber in response to pressure variations occurring in said working fluid chamber, and including means for controlling the volume of said control fluid in said control fluid chamber to effect movement of said shutter panel means between its extended and retracted positions.

8. In a fluid filled vibration isolator having compliant means providing a variable volume working fluid chamber displaceable in response to vibrations of the working fluid and an inertia track passageway cooperable therewith to provide certain dynamic operating characteristics, a control fluid chamber adjacent to said working fluid chamber for containing a compressible control fluid, and flexible means separating said control fluid chamber from said working fluid chamber while normally providing a portion of the overall compliance of said working fluid chamber, the improvement comprising: mounting means carried by said compliant means for connecting it to a structure, said mounting means having an interior wall defining said control fluid chamber, said control fluid chamber having an end confronting said working fluid chamber, said flexible means including a diaphragm extending across said end of said control fluid chamber for containing said compressible control fluid therein, means on said mounting means providing a shoulder confronting said working fluid chamber adjacent said end of the said control fluid chamber, shutter panel means extending across said control fluid chamber in spaced parallel relation with said diaphragm, means connecting said shutter panel means to said diaphragm so that both move in substantially parallel relation in response to changes in relative pressure between said control fluid chamber and said working fluid chamber, and means for controlling said relative pressure in said control chamber for selectively displacing said shutter panel means between an extended position spaced from said shoulder in said working fluid chamber and a retracted position engaged therewith, whereby certain dynamic operating characteristics of the vibration isolator can be adjusted.

* * * * *